United States Patent
Mochizuki et al.

(10) Patent No.: US 6,913,860 B2
(45) Date of Patent: Jul. 5, 2005

(54) IMAGE FORMING MATERIAL, METHOD AND DEVICE FOR REMOVING IMAGES, AND IMAGE FORMING PROCESS AND APPARATUS

(75) Inventors: Hidehiro Mochizuki, Numazu (JP); Tadashi Saitou, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 10/207,995

(22) Filed: Jul. 31, 2002

(65) Prior Publication Data

US 2003/0050190 A1 Mar. 13, 2003

(30) Foreign Application Priority Data

Jul. 31, 2001 (JP) ........................................ 2001-232576

(51) Int. Cl.[7] .................... G03C 11/12; G03C 11/24; G03F 7/42; C09D 11/00; C09D 13/00
(52) U.S. Cl. .................... 430/19; 430/110; 430/126; 430/199; 430/200; 430/291; 106/31.09; 106/31.29; 106/31.32; 106/31.61; 106/31.64; 347/103
(58) Field of Search .................... 430/19, 110, 126, 430/199, 200, 291; 106/31.09, 31.29, 31.32, 31.61, 31.64; 347/103

(56) References Cited

U.S. PATENT DOCUMENTS

| | | | |
|---|---|---|---|
| 4,883,736 A | * | 11/1989 | Hoffend et al. |
| 5,006,189 A | | 4/1991 | Tsukamoto et al. |
| 5,858,598 A | | 1/1999 | Nakayama |
| 5,863,697 A | | 1/1999 | Uchiyama et al. |
| 2001/0008164 A1 | | 7/2001 | Sano et al. |

FOREIGN PATENT DOCUMENTS

| | | |
|---|---|---|
| EP | 0 780 242 | 6/1997 |
| EP | 0 844 534 | 5/1998 |
| EP | 0 955 568 | 11/1999 |
| JP | 03-158280 | 7/1991 |
| JP | 04-064472 | 2/1992 |

OTHER PUBLICATIONS

Derwent Publications, AN 2001–573616, XP–002221713, JP 2001–060016, Mar. 6, 2001.
Patent Abstracts of Japan, JP 10–097092, Apr. 14, 1998.
Patent Abstracts of Japan, JP 07–056387, Mar. 1995.
U.S. Appl. No. 10/207,995, filed Jul. 31, 2002, Mochizuki et al.
U.S. Appl. No. 10/677,346, filed Oct. 3, 2003, Nagayama et al.

* cited by examiner

Primary Examiner—Richard L. Schilling
(74) Attorney, Agent, or Firm—Oblon, Spivak, McClelland, Maier & Neustadt, P.C.

(57) ABSTRACT

An image forming material for forming an image on an image recording material with an image binding force being established between the image and the image recording material, the image forming material containing an image forming substance, and a binding force reducing substance which reduces the image binding force when the image is heated. A method of removing an image formed on an image recording material with a binding force being established between the image and the recording material by contacting a stripping member with the image with heating under pressure. A binding force reducing substance may be contained in the surface of the stripping member or in the image recording material.

37 Claims, 1 Drawing Sheet

IMAGE FORMING MATERIAL, METHOD AND DEVICE FOR REMOVING IMAGES, AND IMAGE FORMING PROCESS AND APPARATUS

BACKGROUND OF THE INVENTION

This invention relates generally to an image forming material and, more specifically, to an image forming material for forming a stable image on an image recording material by, for example, ordinary printing such as letterpress printing or lithographic printing, electrophotography, ink jet printing, thermal transfer recording or writing such as with crayon or pens, wherein the image is able to be removed from the image recording material. The present invention is also directed to a method for removing an image on an image recording material, to a device for carrying out the method, to a process for forming an image and to an apparatus for carrying out the process.

With rapid progress of various information recording and transmitting means, the level of information output has very increased and paper consumption has increased significantly. In an effort to reduce the consumption of paper and to conserve forest resources, recycling of waste paper is now an important concern. Thus, many methods have been hitherto proposed to recycle waste papers, especially toner image-bearing papers produced by electrophotography.

One known method is to treat a paper to improve erasability of the toner images. Such a method has a problem because the recyclable paper is not available at a low cost. Another method is to use an erasable toner whose color is erasable by irradiation thereof with a light (Japanese Patent No. 2,960,229). This method has a problem because the discolored material remaining on the paper adversely affect the surface smoothness thereof so that it is difficult to reuse same for image formation. Japanese Laid-Open Patent Publication No. H08-146649 proposes a toner containing a surfactant to improve water absorbing efficiency. This toner, however, requires a wet treatment to remove the toner images from the image-bearing recording material and, therefore, has a problem because the size of the paper increases due to swelling.

SUMMARY OF THE INVENTION

It is, therefore, an object of the present invention to provide an image forming material which can form a stable and high grade image on an ordinary image recording material such as plain paper and which permits the removal of the image from the recording material.

Another object of the present invention is to provide an image forming material of the above-mentioned type which permits the removal of the image from the recording material without using a wet treatment and which allows for the reuse of the recording material for image formation.

It is a further object of the present invention to provide a simple method and a device for removing an image from an image-bearing recording material.

It is yet a further object of the present invention to provide a process and a apparatus for forming an image on an image recording material.

In accomplishing the foregoing objects, there is provided in accordance with one aspect of the present invention an image forming material for forming an image on an image recording material with an image binding force being established between said image and said image recording material, said image forming material comprising an image forming substance, and a binding force reducing substance which reduces said image binding force when said image is heated.

In another aspect, the present invention provides a method of removing an image of an image forming material according to claim 1 formed on an image recording material, said method comprising the steps of:

contacting a stripping member under pressure with said image on said image recording material while heating said image to reduce said image binding force; and peeling said image recording material from said stripping member to transfer said image from said image recording material to said stripping member.

The present invention also provides a method of removing an image of an image forming material formed on an image recording material with an image binding force being established between said image and said image recording material, said method comprising the steps of:

providing a stripping member having a surface resin layer comprising a binding force reducing substance, said binding force reducing substance being adapted to reduce said image binding force when said image is heated in the presence of said binding force reducing substance;

contacting said surface of said stripping member under pressure with said image on said image recording material while heating said image to reduce said image binding force established between said image and said image recording material; and peeling said image recording material from said stripping member to transfer said image from said image recording material to said stripping member.

In a further aspect, the present invention provides a device for removing an image of the above image forming material formed on an image recording material, said device comprising:

a stripping member providing an adhesion strength between said stripping member and said image which is not smaller than said image binding force;

means for contacting said stripping member with said image on said image recording material under pressure;

a heater for heating said image during its contact with said stripping member under pressure, thereby reducing said binding force; and drive means for separating said image recording material from said stripping member so that said image is transferred from said image recording material to said stripping member.

In a further aspect, the present invention provides a device for removing an image of an image forming material formed on an image recording material with an image binding force being established between said image and said image recording material, said device comprising:

a stripping member having a surface layer comprising a binding force reducing substance adapted to reduce said image binding force when said image is heated in the presence of said binding force reducing substance, said surface layer is adapted to release said binding force reducing substance when heated so that an adhesion strength which is not smaller than said image binding force is established between said stripping member and said image after the release of said binding force reducing substance;

means for contacting said stripping member with said image on said image recording material under pressure;

a heater for heating said image during its contact with said stripping member under pressure, thereby reducing said binding force established between said image and said image recording material; and drive means for separating said image recording material from said stripping member so that said image is transferred from said image recording material to said stripping member.

In a further aspect, the present invention provides an image forming process comprising depositing the above image forming material on an image recording material. In a further aspect, the present invention provides an image forming process comprising depositing an image forming material On an image recording material, and removing the image formed on said image recording material in accordance with the above image removing method to obtain a recycled recording material, and forming an image on said recycled recording material.

In a further aspect, the present invention provides an image forming process comprising forming an image on an image recording material with an image binding force being established between said image and said image recording material, wherein before said image is formed, a binding force reducing substance is deposited on said image. recording material, said binding force reducing substance reducing said image binding force when said image is heated.

In a further aspect, the present invention provides an image forming apparatus comprising an image forming device for forming an image on an image recording material, and the above image removing device.

In a further aspect, the present invention provides an image forming process comprising forming an image on an image recording material with an image binding force being established between said image and said image recording material, wherein before said image is formed, a binding force reducing substance is deposited on said image recording material, said binding force reducing substance reducing said image binding force when said image is heated.

BRIEF DESCRIPTION OF THE DRAWINGS

Other objects, features and advantages of the present invention will become apparent from the detailed description of the preferred embodiments of the invention which follows, when considered in the light of the accompanying drawing, in which.

DETAILED DESCRIPTION OF THE PREFERRED EMBODIMENTS OF THE INVENTION

Figure 1:
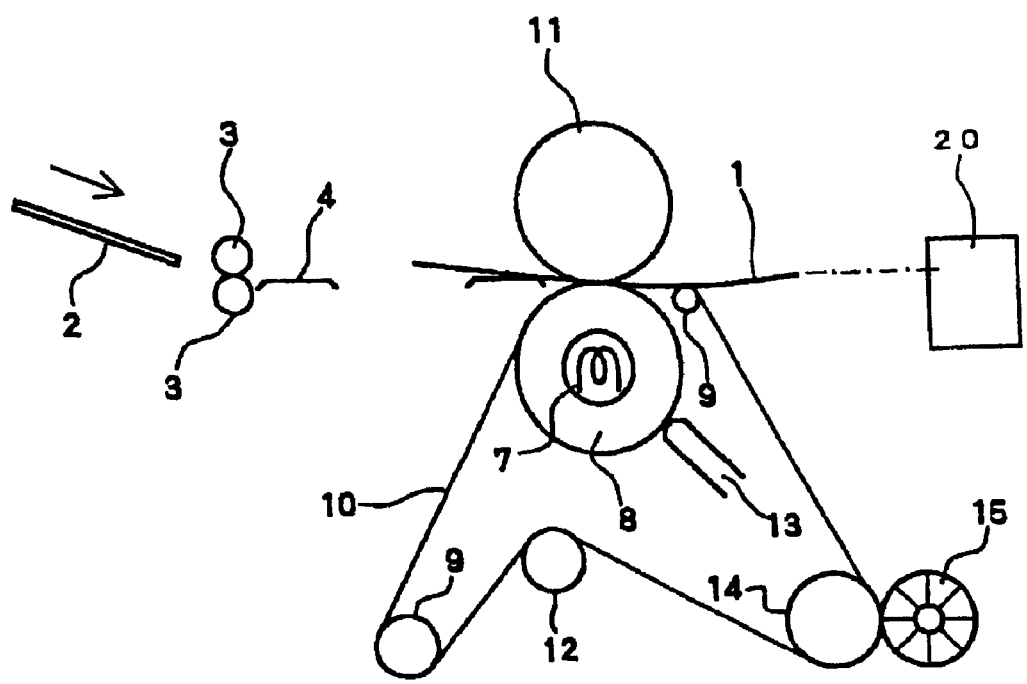
FIG. 1 is a cross-sectional view diagrammatically illustrating an embodiment of an image removing device according to the present invention connected to an image forming apparatus.

According to the present invention, an image formed on an image recording material with a binding force being established between the image and the recording material is removed by contacting a stripping member with the image with heating under pressure. As a consequence of such a contact, the image is softened to reduce the binding force while increasing an adhesion strength between the image and the stripping member.

In one preferred embodiment, the heating under pressure is carried out in the presence of a binding force reducing substance. The binding force reducing substance which is present in an interface between the image and the recording material reduces the binding force established between the image and the recording material to permit the removal of the image from the recording material. Thus, when the recording material is peeled from the stripping member, the image is transferred from the recording material to the stripping member. The resulting recording material may be recycled.

It is desirable that the image binding force is reduced to 2.0 $kg/cm^2$ or less by the heating for reasons of completely removing the image from the image recording material. It is also desirable that the image binding force is 1 to 4.5 $kg/cm^2$ or less at room temperature.

As used herein the term "image binding force" is measured using a probe tack tester (Model TAC-II manufactured by Reska Inc.). The image binding force at room temperature is measured as follows. A pressure sensitive adhesive double coated tape is adhered to a tip (diameter: 5 mm) of a probe of the tester. The probe is extended at a rate of 120 mm/min, pressed against the sample at a probe contact pressure of 500 gf per area of the probe tip for a dwell time of 10 seconds and then retracted at a rate of 600 mm/min. The force required to free the probe from the sample (i.e. to remove the image from the recording material), measured in $grams/cm^2$, is read from the indicator on the tester. These steps are performed at room temperature. The image binding force at elevated temperature is measured in the same manner as above except that a 100 $\mu$m thick stripping film made of a polyether ether ketone (SUMILITE FS-1100C manufactured by Sumitomo Bakelite Inc.) is bonded on a tip of the probe in place of the double coated tape and that the test is conducted at a given elevated temperature.

In another preferred embodiment, the present invention provides an image forming material for forming an image On an image recording material with an image binding force being established between the image and the image recording material, wherein the image forming material comprises an image forming substance, and a binding force reducing substance which reduces the image binding force when the image is heated. With this embodiment, the image recording material need not be specifically treated. Further, mere heating under pressure is sufficient to remove the image. Such a removal treatment may be suitably carried out using a toner image fixing device.

It is preferred that the image forming substance further comprises a binder resin. The binder resin serves to provide sufficient cohesive force in the heated image layer so that the image is not destroyed during peeling thereof from the image recording material. To maintain a suitable cohesive force, the binder resin is preferably such that the image formed from the binder resin-containing image forming substance has a viscoelasticity of $10^4$ Pa to $10^6$ Pa when heated for the removal of the image from the recording material. The binder resin is preferably a thermally crosslinked resin to attain suitable viscoelasticity.

A toner for use in electrophotography generally contains a binder and a colorant and is suitably used as the image forming substance of the image forming material of the present invention. When the image forming material is a crayon as an writing instrument or a thermal transfer ribbon as a thermal transfer recording using a thermal head, the use of a binder resin is preferred.

The binding force reducing substance is preferably a low melting point substance. When the image is heated at a temperature higher than the softening point of the low melting point substance, the low melting point substance is melted during heating and is easily located in an interfase between the image and the recording material to prevent binding of the image to the recording material and to permit easy removal of the image from the recording material, When the image has been fixed to the recording material by heating under pressure, such as in the case of toner image fixation, the low melting point substance serves to prevent establishment of an excessively high binding force between the image and the recording material. It is preferred that the low melting point substance, when melted, should not function as a solvent for components of the image forming substance, since otherwise the binding force between the image and the recording material would undesirably excessively increase.

It is preferred that a low melting point substance have a hydrophilic group when the image forming substance is a hydrophobic in nature, such as a toner, since the low melting point substance when melted is separated from the image to accelerate the accumulation of the low melting point substance in the interface between the image and the recording material. In addition, when the recording material is made of cellulose, the melted low melting point substance having hydrophilic groups facilitate the removal of the image from the recording material. Although not wishing to be bound by the theory, the hydrophilic groups of the low melting point substance are considered to interact with the hydroxyl groups of the cellulose through hydrogen bonding, thereby preventing the penetration of the low melting point substance deep into the recording material.

It is also preferred that the low melting point substance have both hydrophilic and hydrophobic (lipophilic) groups, especially when the image forming substance and/or the stripping member have lipophilic (hydrophobic) groups, since the amount of the low melting point substance remaining on the recording material after the transfer of the image from the recording material to the stripping member is reduced and since the recyclability of the recording material may be improved.

The low melting point substance is preferably a compound represented by the following formula:

$(R)_n \cdot (Z)_m$ wherein R represents an organic group, Z is a hydrophilic group, n is an integer of 1 to 3 determined according to the valency of Z, and m is an integer of at least 1.

In the above formula, R is preferably selected from —$PO_3H_2$, =POH, —OH, —O—, —COOH, —CH(OH)$CH_2$COOH, —OCOY (where Y is an alkyl group which may have one or more substitutents, an aryl group which may have one or more substitutents, or an aralkyl group which may have one or more substitutents), —$SO_3H$, ≡$N^+X^-$ (where X is a halogen atom), —$CONH_2$ and —$NH_2$, n is an integer of 1 to 3 determined according to the valency of z, and m is at least 1 but is 1 only when Z is =$PO_2H$ or ≡$N^+X^-$.

In the above formula, R is preferably an alkyl group having 1 to 40 carbon atoms, more preferably 3 to 30 carbon atoms, most preferably 6 to 22 carbon atoms, or an aralkyl group having 7 to 40 carbon atoms, more preferably 7 to 30 carbon atoms. The alkyl and aralkyl groups may contain one or more halogen atoms such as fluorine atoms.

The low melting point substance is preferably a dialkyl compound having a hydrophilic group, such as $(R)_2PO_2H$, for reasons of prevention of absorption of moisture. The low melting point substance is also preferably an aromatic group-containing compound for reasons of prevention of absorption of moisture. The hydrophobicity (lipophilicity) and steric hindrance of the dialkyl groups and the aromatic group are considered to prevent water molecules from entering in the image forming material so that the moisture absorbing property thereof is suppressed. When the image forming material for use in, for example, developing electrostatic latent images has moisture absorbing properties and is hygroscopic in nature, a problem such as agglomeration thereof is apt to be caused during storage. Thus, it is desirable that the image forming material hardly absorbs water.

In a preferred embodiment, the image forming substance is in the form of solid particles, such as toner, while the low melting point substance is bound to outer surfaces of the solid particles. In this case, the low melting point substance is preferably present in an amount of 1 to 50% by weight, more preferably 5 to 20% by weight, based on the a total weight of the image forming substance and the low melting point substance for reasons of suitable binding force reducing efficiency during heating stage while maintaining suitable binding force during non-heating stage and, hence, suitable storage stability of the image-bearing recording material.

In another embodiment, the image forming substance is in the form of solid particles, such as toner, while the low melting point substance is contained in the solid particles. In this case, the low melting point substance is preferably present in an amount of 5 to 75% by weight, more preferably 10–30% by weight, based on the a total weight of the image forming substance and the low melting point substance for reasons of suitable binding force reducing efficiency during heating while maintaining suitable binding force during non-heating.

The low melting point substance preferably has a melting point of 60 to 150° C., more preferably 70 to 120° C. for reasons of suitable binding force reducing efficiency during heating while maintaining suitable binding force during non-heating. The low melting point substance is preferably in the form of powder having an average particle diameter of 0.1 to 20 μm, more preferably 0.5–10 μm for reasons of ensuring suitable image quality of the image forming substance and suitable binding force reducing efficiency.

In another preferred embodiment, the image forming material comprises, in addition to the image forming substance and the binding force reducing substance, fine support particles which are infusible or which have a melting point higher than that of the low melting point substance. In this case, the low melting point substance is bound to the fine support particles to improve the binding force reducing efficiency. The fine support particles serve to reduce an adverse affect by the low melting point substance and to improve storage stability of the image-bearing recording material. The binding of the low melting point substance with the fine support particles may be, for example, ionic bonding or hydrogen bonding.

The fine support particles to which the low melting point substance is bound have preferably an average particle diameter of 0.1 to 20 μm, more preferably 0.5–10 μm for reasons of ensuring suitable image quality of the image forming substance and suitable binding force reducing efficiency of the low melting point substance. The low melting point substance is present in an amount of 10 to 90% by weight based on a total weight of the low melting point substance and the fine support particles to ensure suitable binding force reducing effect during heating.

The fine support particles to which the low melting point substance is bound may be bound to outer surfaces of the solid particles of the image forming substance. In this case, the fine support particles to which the low melting point substance is bound are present in an amount of 1 to 50% by weight, preferably 5 to 30% by weight based on the a total weight of the image forming substance, the fine support particles and the low melting point substance for reasons of suitable binding force reducing effect during heating while maintaining suitable binding force during non-heating.

Alternately, the fine support particles to which the low melting point substance is bound may be contained in the solid particles of the image forming substance. In this case, the fine support particles to which the low melting point substance is bound are present in an amount of 5 to 75% by weight, preferably 10 to 40% by weight, based on the a total weight of the image forming substance, the fine support particles and the low melting point substance for reasons of suitable binding force reducing effect during heating while maintaining suitable binding force during non-heating.

As described previously, the low melting point substance preferably has hydrophilic groups and hydrophobic groups. In this case, it is also preferred that the fine support particles have hydrophilic groups for reasons of improved removal efficiency of the image from the recording material and improved moisture absorption-preventing effect. Although not wishing to be bound by the theory, the hydrophilic groups of the low melting point substance are considered to interact with the hydrophilic groups of the fine support particles through hydrogen bonding, so that the low melting point substance is bound by the fine support particles during heating, thereby preventing the penetration of the low melting point substance into the recording material and reducing moisture absorbing properties. In addition, the presence of the hydrophobic groups in the low melting point substance can reduce the moisture absorbing properties.

In another embodiment, the image forming material comprises, in addition to the image forming substance, the low melting point substance, fine support particles which are infusible or which have a melting point higher than that of the low melting point substance, wherein the low melting point substance is held within the fine support particles.

In this case, too, the low melting point substance is preferably present in an amount of 10 to 90% by weight based on a total weight of the low melting point substance and the fine support particles.

The fine support particles in which the low melting point substance is held may be bound to outer surfaces of the solid particles of the image forming substance. In this case, the fine support particles in which the low melting point substance is held are preferably present in an amount of 1 to 50% by weight, more preferably 5 to 30% by weight, based on the a total weight of the image forming substance, the fine support particles and the low melting point substance.

Alternatively, the fine support particles in which the low melting point substance is held may be contained in the solid particles of the image forming substance. In this case, the fine support particles in which the low melting point substance is held are preferably present in an amount of 5 to 75% by weight, more preferably 10 to 40% by weight, based on the a total weight of the image forming substance, the fine support particles and the low melting point substance. The fine support particles in which the low melting point substance is held preferably have an average particle diameter of 0.1 to 20 $\mu$m, more preferably 0.5–10 $\mu$m.

In another embodiment, the fine support particles are porous particles. In this case, the low melting point substance is preferably incorporated into the pores of the fine support particles, since the amount of the low melting point substance may be increased to facilitate the reduction of the image binding force between the image and the recording material during heating, while maintaining suitable image binding force during non-heating stage.

The fine support particles may be, for example, those of the following materials various carbides, such as silicon carbide, boron carbide, titanium carbide, zirconium carbide, hafnium carbide, vanadium carbide, tantalum carbide, niobium carbide, tungsten carbide, chromium carbide, molybdenum carbide, calcium carbide and diamond carbon random; various nitrides such as boron nitride, titanium nitride and zirconium nitride; various bromides such as zirconium bromide; various oxides, such as titanium oxide, calcium oxide, magnesium oxide, zinc oxide, copper oxide, aluminum oxide, silica and colloidal silica; various sulfides such as molybdenum disulfide; various fluorides such as magnesium fluoride and carbon fluoride; various metal soaps, such as aluminum stearate, calcium stearate, zinc stearate and magnesium stearate; various minerals such as talc and bentonite; various metals, such as cobalt, iron, nickel, aluminum, copper, lead, magnesium, tin, zinc, antimony, beryllium, bismuth, cadmium, calcium, manganese, selenium, titan, tungsten and vanadium, and alloys thereof; various titanic acid compounds, such as calcium titanate, magnesium titanate and strontium titanate; various polymer particles, which are formed into particles by a wet polymerization method such as an emulsion polymerization method, a soap-free emulsion polymerization method and a non-aqueous dispersion polymerization method, and a vapor phase method, such as styrene, (metha)acrylic polymers, polyolefins, fluorine-containing (metha)acrylic polymers, nitrogen-containing (metha)acrylic polymers, epoxy resins, silicone resins, benzoguanamine resins, melamine resin; various natural polymers, such as starch (sweet potato starch, potato starch, tapioca starch, wheat starch, corn starch), mannan (devil's-tongue), seaweeds (funorin, agar, sodium alginate), plant mucilage (hibiscus, tragacanth, gum arabic), microbiological mucilage (dextran, levan), and protein (glue, gelatin, casein, collagen): various semi-synthetic polymers, such as cellulose (viscose, methyl cellulose, ethyl cellulose, hydroxyethyl cellulose, carboxy methyl cellulose), and starch (soluble starch, carboxy methyl starch, dialdehyde starch); and various synthetic polymers such as polyvinyl alcohol, sodium polyacrylate, polyethylene oxide and isobutyrene-maleic anhydride copolymers. These fine support particles may be used alone or in combination. If desired, the above inorganic fine support particles may be treated by a known suitable method with a conventionally used hydrophobisizing agent, such as a silane coupling agent, a titanate coupling agent, silicone oil and silicone vanish.

In another embodiment, the image forming substance is in the form of solid particles, wherein the low melting point substance is contained in outer peripheral regions of the solid particles, and wherein the low melting point substance is present in an amount of 5 to 75% by weight based on the a total weight of the image forming substance and the low melting point substance. Since the low melting point substance is present predominantly in an outer region of each of the image forming substance particles, suitable binding force reducing effect is obtainable even when the amount of the low melting point substance is small.

If desired, a charge controlling agent may be incorporated into the fine support particles and/or low melting point substance to improve transferability thereof to the image recording material. Any charge controlling agent customarily employed in the field of electrophotography may be used.

The image forming substance which includes a colorant and, optionally, a binder resin may be a toner for use in, for example, electrophotography, powder ink for solid ink jet recording, ink for thermal transfer recording, ink for ordinary printing such as letterpress printing or lithographic printing and other solid inks such as crayon. The image recording material on which images are formed with the above image forming substance may be, for example, ordinary paper made of fibers and generally used with conventional copying machines and printers, or a plastic film for overhead projectors.

Description will be made of a toner which is a typical example of the image forming substance, The toner generally includes a colorant, a binder resin and optional ingredients such as a charge controlling agent, a release agent, a magnetic substance, a filler and a post treating agent.

The binder resin may be any thermoplastic resin used for conventional toners. Illustrative of suitable binder resins are a styrene-acrylic copolymer resin, a styrene resin, a (meth) acrylic resin, an olefin resin, a polyester resin, a polyamide resin, a polycarbonate resin, a polyether resin, a polysulfone resin, an epoxy resin, an urethane resin, a phenol resin, a urea resin, copolymers thereof and mixtures thereof. The binder resin generally has a number average molecular weight Mn of about 6,000 to 20,000 and a ratio Mw/Mn of the weight average molecular weight Mw to the number average molecular weight Mn of about 2 to 100. The above molecular weight and molecular weight distribution are, however, not restrictive and may be changed as long as toner having desired characteristics may be obtained.

A variety of types and colors of organic and inorganic pigments and dyes conventionally used in the art are usable as a colorant contained in the toner of the invention.

Examples of usable black pigments include carbon black, cupric oxide, manganese dioxide, aniline black, activated carbon, non-magnetic ferrite, magnetic ferrite and magnetite.

Examples of usable yellow pigments include chrome yellow, zinc yellow, cadmium yellow, yellow oxide, mineral fast yellow, nickel titanium yellow, NABLES YELLOW, NAPHTHOL YELLOW S, HANSA YELLOW G, HANSA YELLOW 10G, benzidine yellow G, benzidine yellow GR, quinoline yellow lake, permanent yellow NCG and tartrazine lake.

Examples of usable orange pigments include chrome orange, molybdenum orange, permanent orange GTR, pyrazolone orange, VULCAN ORANGE, INDANTHRENE BRILLIANT ORANGE RK, benzidine orange G and INDANTHRENE BRILLIANT ORANGE GK.

Examples of usable red pigments include iron oxide red, cadmium red, red lead oxide, cadmium mercury sulfide, cadmium, permanent red 4R, LITHOL RED, pyrazolone red, WATCHING RED, calcium salt, lake red D, BRILLIANT CARMINE 6B, eosin lake, rhodamine lake B, alizarin lake and BRILLIANT CARMINE 3B.

Examples of usable violet pigments include manganese violet, fast violet R and methyl violet lake.

Examples of usable blue pigments include prussian blue, cobalt blue, alkali blue lake, victoria blue lake, phthalocyanine blue, metal-free phthalocyanine blue, phthalocyanine blue partial chlorine compound, FAST SKY BLUE and INDANTHRENE BLUE BC.

Examples of usable green pigments include chrome green, chrome oxide, pigment green B, malachite green lake and FANAL YELLOW GREEN G.

Examples of usable white pigments include zinc white, titanium oxide, antimony white and zinc sulfide.

Examples of usable extender pigments include powdery barytes, barium carbonate, clay, silica, white carbon, talc and alumina white.

As various types of dyes such as basic dyes, acid dyes, disperse dyes and direct dyes may be usable. Examples of such dyes include nigrosine, methylene blue, rose bengale, quinoline yellow and ultramarine blue.

These colorants may be used alone or in combination of plural types. The amount of the colorant is generally 1 to 20 parts by weight, preferably, 2 to 10 parts by weight, per 100 parts by weight of the binder resin of the toner for reasons of suitable image density and fixing properties.

Various types and colors of pigments and dyes, as listed below, are usable as the colorant of a transparent color toner.

Examples of usable yellow pigments include C.I.10316 (naphthol yellow S), C.I.11710 (HANSA YELLOW 10G), C.I.11660 (HANSA YELLOW 5G), C.I.11670 (HANSA YELLOW 3G), C.I.11680 (HANSA YELLOW G), C.I.11730 (HANSA YELLOW GR), C.I.11735 (HANSA YELLOW A), C.I.11740 (HANSA YELLOW RN), C.I.12710 (HANSA YELLOW R), C.I.12720 (PIGMENT YELLOW L), C.I.21090 (benzidine yellow), C.I.21095 (benzidine yellow G), C.I.21100 (benzidine yellow GR), C.I.20040 (permanent yellow NCG), C.I.21220 (VULCAN FAST YELLOW 5) and C.I.21135 (VULCAN FAST YELLOW R).

Examples of usable red pigments include C.I.12055 (STERLING I), C.I.12075 (permanent orange), C.I.12175 (LITHOL FAST ORANGE 3GL), C.I.12305 (permanent orange GTR), C.I.11725 (HANSA YELLOW 3R), C.I.21165 (VULCAN FAST ORANGE GG), C.I.21110 (benzidine orange G), C.I.12120 (permanent red 4R), C.I.1270 (PARA RED), C.I.12085 (FIRE RED), C.I.12315 (BRILLIANT FAST SCARLET), C.I.12310 (permanent red FR2), C.I.12335 (permanent red F4R), C.I.12440 (permanent red FRL), C.I.12460 (permanent red FRLL), C.I.12420 (permanent red F4RH), C.I.12450 (LIGHT FAST RED TONER B), C.I.12490 (permanent carmine FB) and C.I.15850 (BRILLIANT CARMINE 6B).

Examples of usable blue pigments include C.I.74100 (metal-free phthalocyanine blue), C.I.74160 (phthalocyanine blue) and C.I.74180 (FAST SKY BLUE).

These colorants for the transparent color toner may be used alone or in combination of plural types. The amount of the colorant is generally in the range of 1 to 10 parts by weight, preferably 2 to 5 parts by weight, per 100 parts by weight of the binder resin of the toner for reasons of suitable color density and suitable transparency.

As the release agent (anti-offset agent), there may be used any known release agent used in the conventional toners. Examples of suitable release agents include low molecular weight polypropylene wax, low molecular weight polyethylene wax, low molecular weight oxidized polypropylene wax, low molecular weight oxidized polyethylene wax, candelilla wax, carnauba wax, rice wax, montan wax and derivatives thereof, paraffin wax and derivatives thereof, microcrystalline wax and derivatives thereof, sazol wax and oxidized derivatives thereof, cured castor oil and derivatives thereof, 1,2-hydroxystearic acid, higher fatty acid wax and higher fatty acid ester wax.

These waxes may be used singly or in combination of two or more. The amount of the release agent is generally in the range of 1 to 10 parts by weight, preferably 2 to 5 parts by weight, per 100 parts by weight of the binder resin contained in the toner, when the toner image is fixed using an oil-less heat roll fixing device. The amount of the release agent is not specifically limited when fixation is carried out using other types of fixing device.

The magnetic substance may be metals such as aluminum, cobalt, iron, lead, magnesium, zinc, nickel, antimony, beryllium, bismuth, cadmium, calcium, manganese, selenium, titanium, tungsten, vanadium, alloys, mixtures, oxides and calcined products (ferrite) of the above metals. The magnetic substance is generally used in an amount of 1 to 80 parts by weight, preferably of 5 to 60 parts by weight, per 100 parts by weight of the binder resin in the toner.

As the charge control agent, there may be used any charge control agent used in the conventional toners. Examples of charge-control agent for a negative charge-toner include chromium complex type azo dyes S-32, S-33, S-34, S-35, S-37, S-38, S-40 (Orient Kagaku Kogyo Co.); Aizen Spilon Black TRH, Aizen Spilon Black BHH (Hodogaya Kagaku Co.); Kayaset Black T-22, Kayaset Black 004 (Nihon Kagaku Co.); Copper phthalocyanine dye S-39 (Orient Kagaku Kogyo Co.); chrome complexes of salicylic acid E-81, E-82 (Orient Kagaku Kogyo Co.); zinc complex E-84 (Orient Kagaku Kogyo Co.); aluminum complex E-86 (Orient Kagaku Kogyo Co.); calix arene compounds and the like. Examples of a charge-control agent for a positive charge-toner include Bontron N-01, Bontron P-51 (Orient Kagaku Kogyo Co.), and imidazole compounds.

The post treating agent is used as an external additive to be bound to surfaces of toner particles. Examples of the post treating agent include carbides such as silicon carbide, boron carbide, titanium carbide, zirconium carbide, hafnium carbide, vanadium carbide, tantalum carbide, niobium carbide, tungsten carbide, chromium carbide, molybdenum carbide, calcium carbide and diamond carbon random; nitrides such as boron nitride, titanium nitride and zirconium nitride; bromides such as zirconium bromide; oxides such as titanium oxide, calcium oxide, magnesium oxide, zinc oxide, copper oxide, aluminum oxide, silica and colloidal silica; sulfides such as molybdenum disulfide; fluorides such as magnesium fluoride and carbon fluoride; metal soaps such as aluminum stearate, calcium stearate, zinc stearate and magnesium stearate; minerals such as talc and bentonite; metals such as cobalt, iron, nickel, aluminum, copper, lead, magnesium, tin, zinc, antimony, beryllium, bismuth, cadmium, calcium, manganese, selenium, titan, tungsten and vanadium; alloys of the above metals; polymer particles, which are formed into particles by a wet polymerization method such as an emulsion polymerization method, a soap-free emulsion polymerization method and a non-aqueous dispersion polymerization method, and a vapor phase method, such as styrene, (metha)acrylic polymers, polyolefins, fluorine-containing (metha)acrylic polymers, nitrogen-containing (metha)acrylic polymers, epoxy resins, silicone resins, benzoguanamine resins, melamine resin and copolymers thereof. These post treating agents may be used singly or in combination. The amount of the post treating agent is generally 0.01–5 parts by weight, preferably 0.1–3 parts by weight, per 100 parts by weight of the toner.

The toner may be prepared by any suitable known method such as a grinding method; a wet method such as a spray dry method, a granulation polymerization method (emulsion polymerization or suspension polymerization) or an emulsion or dispersion granulation method; or a microcapsule method. Specific examples of the method include a mechanical method in which ingredients of the toner such as a binder and a colorant are melt-kneaded, solidified, ground and further processed with a hybridizer or a mechanofusion; a spray dry method in which ingredients of the toner are dispersed in a solution of a toner binder dissolved in a solvent, the dispersion being subsequently spray dried; and a dispersion method in which an organic solvent solution, emulsion or dispersion containing ingredients of the toner such as a binder resin or a prepolymer thereof and wax is dispersed in an aqueous medium with stirring, preferably while applying shear forces to the wax, to form toner particles which are subsequently separated and dried. The toner generally has a particle size of 3 to 20 $\mu$m, preferably 4 to 15 $\mu$m, more preferably 6 to 12 $\mu$m.

For depositing or fixing the binding force reducing substance such as a low melting point substance to outer surfaces of particles of the image forming substance such as a toner, the binding force reducing substance (which may be supported by fine support particles through binding to outer surfaces thereof or through incorporation therewithin) and the image forming substance particles are separately prepared and then mixed with each other using a surface modifying device such as a hybridizer or an Ang mill or a mixing device such as a Henschel mixer or a Hi-X mixer. For incorporation of the binding force reducing substance into particles of the image forming substance, the binding force reducing substance is mixed with the ingredients of the image forming substance (such as a colorant and a binder in the case of a toner) and the mixture is then granulated into a desired method such as a grinding method a wet method such as a spray dry method, a granulation polymerization method (emulsion polymerization or suspension polymerization), or an emulsion or dispersion granulation method.

The binding force reducing substance may be supported to the fine support particles by any method such as a surface modifying method. One suitable method is as follows. The fine support particles having hydrophilic groups such as carboxylic acid groups are dispersed in an insoluble solvent such as toluene. The binding force reducing substance having both hydrophilic groups and hydrophobic (lipophilic) groups is then added to the dispersion and the mixture is heated at 90–95° C. with stirring so that the binding force reducing substance is bound to the fine support particles. The solvent is then removed from the mixture to leave solids which are subsequently ground, if necessary.

An image formed on an image recording material using the above-described image forming material may be removed by contacting a stripping member under pressure with the image on the image recording material while heating the image to reduce the image binding force established between the image and the image recording material. The image recording material is then peeled from the stripping member so that the image is transferred from the image recording material to the stripping member.

When the image has been formed on the image recording material by fusing and fixing the image forming substance thereon likewise in the case of a toner image, the heating under pressure of the image is preferably at a temperature higher than the fixing temperature for reasons of improved image removing efficiency attributed to an increased possibility that the low melting point substance (binding force reducing substance) is present at the interface between the image and the recording material.

The stripping member may be in the form of a roller or a film. The surface of the roller or film to which the image is contacted may be made of a resin similar to the binder resin contained in the image. Alternatively, an adhesive resin, a heat resisting resin or a metal such as aluminum, copper, nickel, iron or an alloy may be used as the surface material of the stripping member.

Examples of the adhesive resin include protein adhesives such as glue, gelatin, albumin and casein; carbohydrate adhesives such as starch, cellulose and complex polysaccharide (Arabian gum, tragacanth gum, etc.); thermoplastic adhesives such as vinyl acetate polymers and copolymers, acrylic polymers and copolymers, ethylene copolymers, polyamides, polyesters and polyurethanes; rubber adhesives such as polychloroprene, nitrile rubber, regenerated rubber, SBR and natural rubber; pressure-sensitive adhesives such as rubber and acrylic polymers and copolymers; thermoplastic resins which are the same as or which have good affinity with the resin contained in the image forming substance, such as vinyl acetate polymers and copolymers, (meth)acrylic polymers and copolymers, olefin polymers and copolymers, styrene polymers and copolymers, styrene-acrylic copolymers, polyamides, polycarbonates, polysulfones, polyethers, epoxy resins, urea resins, polyesters and polyurethanes; rubber adhesives such as polychloroprene, nitrile rubber, regenerated rubber, SBR and natural rubber; and titanium oxide-dispersed poly (ethylene terephthalate). Films of polyether sulfone, polyether imide, polysulfone, polyethylene terephthalate, aromatic polyamide or polyether ether ketone may also be suitably used as the surface material of the stripping member.

In a further embodiment, the material constituting the surface of the stripping member contains the above-described binding force reducing substance. In this case, an image formed on an image recording material with an image binding force being established between the image and the image recording material is removed by contacting the surface of the stripping member under pressure with the image on the image recording material while heating the image to reduce the image binding force by the action of the binding force reducing substance contained in the surface of the stripping member, followed by peeling the image recording material from the stripping member to transfer the image from the image recording material to the stripping member. It is preferred that the image formed on the image recording material be formed from an image forming material of the type described in the foregoing which contains a binding force reducing substance. As described previously, the image preferably has a viscoelasticity of $10^4$ Pa to $10^6$ Pa at the time of the heating. Also, the image binding force is desirably reduced to 2.0 kg/cm$^2$ or less by the heating. Further, the image preferably has been formed on the image recording material by fusing and fixing the image forming material thereon. The heating is preferably at a temperature higher than the fixing temperature at which the image has been formed on the image recording material.

It is further preferred that the surface of the stripping member comprise the binding force reducing substance and a thermoplastic resin which is preferably the same as or which has good affinity with the resin contained in the image forming substance, such as vinyl acetate polymers and copolymers, (meth)acrylic polymers and copolymers, olefin polymers and copolymers, styrene polymers and copolymers, styrene-acrylic copolymers, polyamides, polycarbonates, polysulfones, polyethers, epoxy resins, urea resins, polyesters and polyurethanes, since the image on the image recording material shows good adhesion to the stripping member because of the similarity of the resins and since resin of the surface of the stripping member is prevented from transferring to the non-image portion (background portion) of the image recording material because of the presence of the binding force reducing substance in the stripping surface. The amount of the binding force reducing substance is generally 1–75% by weight, preferably 5–20% by weight, based on a total weight of the binding force reducing substance and the thermoplastic resin. It is preferred that the stripping member have a surface layer which contains the above binding force reducing substance and the thermoplastic resin and which is provided on a support which is resistant to heat and tension and has dimensional stability.

FIG. 1 depicts a device for removing an image of an image forming material formed on an image recording material 1. The device has a stripping member 10 which, in the illustrated case, is an endless film supported by a drive roller 8, support rollers 9 and tension rollers 12 and 14. Disposed in parallel with the drive roller 8 is a roller 11 defining therebetween a nip through which the film (stripping member) 11 passes and runs upon driving of the roller 8. The image recording material 1 bearing an image thereon is fed to the nip from a feed tray 2 though feed rollers 3 and a guide plate 4, so that the image on the image recording material 1 is contacted with the stripping member 10 under pressure. A heater 7 is disposed in the drive roller 8 for heating the image on the recording material 1 during its contact with the stripping member 10 under pressure, thereby reducing the binding force established between the image and the recording material 1 while providing an adhesion strength between the stripping member 10 and the image which adhesion strength is not smaller than the image binding force. The recording material 1 is further driven by the roller 8 to be discharged from the nip and separated from the stripping member 10 so that the image is transferred from the image recording material 1 to the stripping member 10. The image transferred to the stripping member 10 is removed therefrom by a cleaning member such as a roller, blade or brush. Designated as 13 is a temperatures sensor electrically coupled to the heater 7 through a suitable control device, so that the nip may be maintained at a desired temperature. The recording material 1 from which the image has been removed is collected and recycled to an image forming device 20 for forming an image thereon.

In another preferred embodiment, there is provided an image forming process which comprises forming an image on an image recording material with an image binding force being established between the image and the image recording material, wherein before the image is formed, the above-described binding force reducing substance is deposited on the image recording material. The binding force reducing substance reduces the image binding force when the image is heated so that the image can be removed. Since the binding force reducing substance and an image forming substance from which the image is formed are stored separately from each other, storage stability of the image forming substance is not adversely affected by the binding force reducing substance. In addition, it is possible to form images without using binding force reducing substance if image removal is not intended.

The following examples will further illustrate the present invention.

EXAMPLE 1

Toner (Imagio Toner Type 18 manufactured by Ricoh Company, Ltd.) as an image forming substance and $C_{17}H_{35}PO_3H_2$ powder having an average particle diameter of 3 μm as a binding force reducing substance were mixed using a mill to obtain a developer (an image forming material) containing 20% by weight of the binding force reducing substance based on a total weight of the image forming substance and the low melting point substance. Using the thus obtained developer, a toner image having an image density of 1.2 was formed on plain paper (PPC paper Type 6200 manufactured by Ricoh Company, Ltd.) at a paper feed rate of about 30 mm/second. The temperature of the toner image fixing roll was about 100° C. The toner image was evaluated for fixation by scratching the image bearing paper with a nail. The fixation was rated as follows:

A: the image is not removed at all
B: part of the image remains unremoved
C: the image is completely removed The results are shown in Table 1.

The image bearing paper was then charged on an image removing device constructed as shown in FIG. 1. The image removing device had a stripping member 10 which was an endless film having a thickness of 100 μm and made of a polyether ether ketone (SUMILITE FS-1100C manufatured by Sumitomo Bakelite Inc.). The image bearing paper was passed through the nip between the rolls 8 and 11 at a feed rate of about 30 mm/second to contact the image with the stripping member 10 while maintaining the driving roll 8 at a temperature of about 110° C. and to remove the image from the paper. The resulting paper was evaluated for removability of the image with naked eyes. The removability was rated as follows:

5: the image is entirely removed
4: the image is almost entirely removed with only a slight portion thereof remaining unremoved
3: a part of the image remains unremoved
2: a significant portion of the image remains unremoved
1: the image almost entirely remains unremoved The results are shown in Table 1.

EXAMPLE 2

Polyacrylic acid particles (as fine support particles) were dispersed in toluene. A binding force reducing substance ($C_{17}H_{35}PO_3H_2$ powder) was then added to the dispersion and the mixture was heated at 90–95° C. with stirring so that the $C_{17}H_{35}PO_3H_2$ was bound to the polyacrylic acid particles. The toluene was then removed from the mixture to leave solids which were subsequently milled to obtain an external additive powder having an average particle size of 3 μm. The thus obtained external additive was mixed with toner (Imagio Toner Type 18 manufactured by Ricoh Company, Ltd.) using a mill to obtain a developer having a $C_{17}H_{35}PO_3H_2$ content of 4% by weight and a polyacrylic acid content of 1% by weight based on a total weight of the toner and the external additive. Using the thus obtained developer, an image was formed on a paper and the image was removed from the paper in the same manner as described in Example 1. The fixation and removability are shown in Table 1.

EXAMPLE 3

Example 2 was repeated in the same manner as described except that the amount of the external additive was increased so that the developer had a $C_{17}H_{35}PO_3H_2$ content of 8% by weight and a polyacrylic acid content of 2% by weight based on a total weight of the toner and the external additive. The results are shown in Table 1.

EXAMPLE 4

Example 2 was repeated in the same manner as described except that the amount of the external additive was increased so that the developer had a $C_{17}H_{35}PO_3H_2$ content of 16% by weight and a polyacrylic acid content of 4% by weight based on a total weight of the toner and the external additive. The results are shown in Table 1. Further, the image was found to have a binding force at room temperature of 1.0 kg/cm$^2$, a binding force at 110° C. of 0.7 kg/cm$^2$ and a viscoelasticity at 110° C. of $10^4$ Pa to $10^5$ Pa.

EXAMPLE 5

Example 2 was repeated in the same manner as described except that the amount of the external additive was increased so that the developer had a $C_{17}H_{35}PO_3H_2$ content of 32% by weight and a polyacrylic acid content of 8% by weight based on a total weight of the toner and the external additive. The results are shown in Table 1.

EXAMPLES 6 to 9

Examples 2 to 5 were repeated in the same manner as described except that polyacrylic acid particles were replaced by ethylene-methyl methacrylic acid (MMA) copolymer having an MMA content of 15 wt %. The results are summarized in Table 1.

EXAMPLE 10

Porous silica particles (as fine support particles) were dispersed in toluene. A binding force reducing substance ($C_{17}H_{35}PO_3H_2$ powder) was then added to the dispersion and the mixture was heated at 90–95° C. with stirring so that the $C_{17}H_{35}PO_3H_2$ was included in the silica particles. The toluene was then removed from the mixture to obtain an external additive powder having an average particle size of 3 μm. The thus obtained external additive was mixed with toner (Imagio Toner Type 18 manufactured by Ricoh Company, Ltd.) using a mill to obtain a developer having a $C_{17}H_{35}PO_3H_2$ content of 2.5% by weight and a silica content of 2.5% by weight based on a total weight of the toner and the external additive. Using the thus obtained developer, an image was formed on a paper and the image was removed from the paper in the same manner as described in Example 1. The fixation and removability are shown in Table 1.

EXAMPLES 11 to 13

Example 10 repeated in the same manner as described except that the amounts of $C_{17}H_{35}PO_3H_2$ and silica were changed to obtain developers having $C_{17}H_{35}PO_3H_2$ and silica contents of each 5% by weight (Example 11), 10% by weight (Example 12) and 20% by weight (Example 13), based on a total weight of the toner and the external additive. The fixation and removability are shown in Table 1.

The softening points of the binding force reducing substances used in Examples are as follows:

$C_{17}H_{35}PO_3H_2$: 96° C.
$C_{16}H_{32}(OH)_2$: 72–74° C.
$C_{21}H_{43}COOH$: 81° C.
$C_{18}H_{37}NH_2$: 50–52
$(C_{18}H_{37}O)_2PO_2H$: 79–81° C.
$(OH)_3BzCO_2C_{18}H_{37}$: 103–104° C.
carnauba wax: 80–90° C.

TABLE 1

| Example | Binding force reducing substance Compound | Amount (wt %) | Fine supporting particles Compound | Amount (wt %) | Fixation | Removability |
|---|---|---|---|---|---|---|
| 1 | $C_{17}H_{35}$—$PO_3H_2$ | 20 | — | — | A | 4 |
| 2 | $C_{17}H_{35}$—$PO_3H_2$ | 4 | Polyacrylic acid | 1 | A | 3 |
| 3 | $C_{17}H_{35}$—$PO_3H_2$ | 8 | Polyacrylic acid | 2 | A | 4 |
| 4 | $C_{17}H_{35}$—$PO_3H_2$ | 16 | Polyacrylic acid | 4 | A | 5 |
| 5 | $C_{17}H_{35}$—$PO_3H_2$ | 32 | Polyacrylic acid | 8 | B | 5 |
| 6 | $C_{17}H_{35}$—$PO_3H_2$ | 4 | Ethylene-MMA copolymer | 1 | A | 3 |
| 7 | $C_{17}H_{35}$—$PO_3H_2$ | 8 | Ethylene-MMA copolymer | 4 | A | 5 |
| 8 | $C_{17}H_{35}$—$PO_3H_2$ | 16 | Ethylene-MMA copolymer | 4 | A | 5 |
| 9 | $C_{17}H_{35}$—$PO_3H_2$ | 32 | Ethylene-MMA copolymer | 8 | B | 5 |
| 10 | $C_{17}H_{35}$—$PO_3H_2$ | 2.5 | Porous silica | 2.5 | A | 4 |
| 11 | $C_{17}H_{35}$—$PO_3H_2$ | 5 | Porous silica | 5 | A | 5 |
| 12 | $C_{17}H_{35}$—$PO_3H_2$ | 10 | Porous silica | 10 | A | 5 |
| 13 | $C_{17}H_{35}$—$PO_3H_2$ | 20 | Porous silica | 20 | B | 5 |

EXAMPLE 14

Example 4 was repeated in the same manner as described except that a diol $(C_{16}H_{32}(OH)_2)$ was substituted for $C_{17}H_{35}PO_3H_2$. The results are shown in Table 2. The image was found to have a binding force at room temperature of 2.0 kg/cm² and a binding force at 110° C. of 1.4 kg/cm².

EXAMPLE 15

Example 4 was repeated in the same manner as described except that a carboxylic acid $(C_{21}H_{43}COOH)$ was substituted for $C_{17}H_{35}PO_3H_2$. The results are shown in Table 2. The image was found to have a binding force at room temperature of 5 kg/cm² or more and a binding force at 110° C. of 2 kg/cm² or more. A significant portion of the image remained unremoved after the image removing treatment.

EXAMPLE 16

Example 4 was repeated in the same manner as described except that an amine $(C_{18}H_{37}NH_2)$ was substituted for $C_{17}H_{35}PO_3H_2$. The results are shown in Table 2. The image was found to have a binding force at room temperature of 5 kg/cm² or more and a binding force at 110° C. of 2 kg/cm² or more. A significant portion of the image remained unremoved after the image removing treatment.

EXAMPLE 17

Example 3 was repeated in the same manner as described except that the stripping member 10 had a surface layer (thickness: about 3 μm) formed of the developer of Example 3. Namely, the surface layer of the stripping member contained the binder of the toner and the $C_{17}H_{35}PO_3H_2$. The results are shown in Table 2.

EXAMPLE 18

Example 4 repeated in the same manner as described except that the removal of the image was performed at a roll temperature of 120° C. The results are shown in Table 2. The image was found to have a viscoelasticity at 120° C. of less than $10^4$ Pa. A part of the image remained unremoved after the image removing treatment

EXAMPLE 19

Example 4 was repeated in the same manner as described except that a phosphinic acid $((C_{18}H_{37}O)_2PO_2H)$ was substituted for $C_{17}H_{35}PO_3H_2$. The results are shown in Table 2. It was confirmed that the external additive (particles of polyacrylic acid to which the phosphinic acid was bound) did not aggregate when allowed to stand for 100 hours in a chamber at 30° C. and a relative humidity of 90%. On the other hand, polyacrylic acid particles without the phosphinic acid formed aggregates when tested in the same manner as above.

EXAMPLE 20

Example 4 was repeated in the same manner as described except that an aromatic ester $((OH)_3BzCO_2C_{18}H_{37};$ Bz designates a benzene nucleus) was substituted for $C_{17}H_{35}PO_3H_2$. The results are shown in Table 2. It was confirmed that the external additive (particles of polyacrylic acid to which the aromatic ester was bound) did not aggregate when allowed to stand for 100 hours in a chamber at 30° C. and a relative humidity of 90%.

EXAMPLE 21

Example 4 was repeated in the same manner as described except that the external additive had an average particle diameter of 10 μm. The results are shown in Table 2.

EXAMPLE 22

Example 4 was repeated in the same manner as described except that the external additive had an average particle diameter of 20 μm. The fixed image was partly removed by scratching with a nail.

EXAMPLE 23

Example 1 was repeated in the same manner as described except that the amount of the $C_{17}H_{35}PO_3H_2$ was increased so that the developer had a $C_{17}H_{35}PO_3H_2$ content of 40% by weigh based on a total weight of the toner and the $C_{17}H_{35}PO_3H_2$. The results are shown in Table 2.

COMPARATIVE EXAMPLE 1

Example 1 was repeated in the same manner as described except that the toner was used by itself for the formation of image. Namely, $C_{17}H_{35}PO_3H_2$ was not used at all. The results are shown in Table 2.

COMPARATIVE EXAMPLE 2

A toner having the same composition as that used in Example 1 except that carnauba wax was additionally contained in an amount of 80% by weight was prepared. Using the wax-containing toner, image formation and removal were carried out in the same manner as described in Example 1. The results are shown in Table 2.

COMPARATIVE EXAMPLE 3

Comparative Example 2 was repeated in the same manner as described except that the amount of the carnauba wax was reduced to 60% by weight. The results are shown in Table 2.

COMPARATIVE EXAMPLE 4

A toner having the same composition as that used in Example 5 except that the binding force reducing substance was not used at all was prepared. Using the resulting toner, image formation and removal were carried out in the same manner as described in Example 1. The results are shown in Table 2.

COMPARATIVE EXAMPLE 5

A toner having the same composition as that used in Example 9 except that the binding force reducing substance was not used at all was prepared. Using the resulting toner, image formation and removal were carried out in the same manner as described in Example 1. The results are shown in Table 2.

COMPARATIVE EXAMPLE 6

A toner having the same composition as that used in Example 12 except that the binding force reducing substance was not used at all was prepared. Using the resulting toner, image formation and removal were carried out in the same manner as described in Example 1. The results are shown in Table 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2001-232576, filed Jul. 31, 2001, inclusive of the specification, claims and drawing, are hereby incorporated by reference herein.

TABLE 2

| Example | Binding force reducing substance Compound | Amount (wt %) | Fine supporting particles Compound | Amount (wt %) | Fixation | Removability |
|---|---|---|---|---|---|---|
| 14 | $C_{16}H_{32}$—$(OH)_2$ | 16 | Polyacrylic acid | 4 | A | 4 |
| 15 | $C_{23}H_{43}$—COOH | 16 | Polyacrylic acid | 4 | A | 2 |
| 16 | $C_{18}H_{37}$—$NH_2$ | 16 | Polyacrylic acid | 4 | A | 2 |
| 17 | $C_{17}H_{35}$—$PO_3H_2$ | 8 | Polyacrylic acid | 2 | A | 5 |
| 18 | $C_{17}H_{35}$—$PO_3H_2$ | 16 | Polyacrylic acid | 4 | A | 3 |
| 19 | $(C_{18}H_{37}O)_2$—$PO_2H$ | 16 | Polyacrylic acid | 4 | A | 4 |
| 20 | $(OH)_3Bz$—$CO_2C_{18}H_{37}$ | 16 | Polyacrylic acid | 4 | A | 3 |
| 21 | $C_{17}H_{35}$—$PO_3H_2$ | 16 | Polyacrylic acid | 4 | A | 5 |
| 22 | $C_{17}H_{35}$—$PO_3H_2$ | 16 | Polyacrylic acid | 4 | B | 5 |
| 23 | $C_{17}H_{35}$—$PO_3H_2$ | 40 | — | — | B | 5 |

TABLE 2-continued

| Example | Binding force reducing substance Compound | Amount (wt %) | Fine supporting particles Compound | Amount (wt %) | Fixation | Removability |
|---|---|---|---|---|---|---|
| Comp. 1 | — | — | — | — | A | 1 |
| Comp. 2 | carnauba wax | 80 | — | — | A | 1 |
| Comp. 3 | carnauba wax | 60 | — | — | A | 1 |
| Comp. 4 | — | — | Polyacrylic acid | 8 | A | 1 |
| Comp. 5 | — | — | Ethylene-MMA copolymer | 8 | A | 1 |
| Comp. 6 | — | — | Porous silica | 10 | A | 1 |

What is claimed is:

1. An image forming material comprising an image forming substance, and an additional binding force reducing substance wherein
said image forming material is capable of forming an image on an image recording material with an image binding force being established between said image and said image recording material, and wherein
said binding force reducing substance does not dissolve the components of said image forming substance when said binding force reducing substance is melted;
said binding force reducing substance is a low melting point substance which reduces said image binding force when said image is heated at a temperature higher than the softening point of said low melting point substance, wherein said low melting point substance has a melting point of 60 to 150° C. and is in the form of powders having an average particle diameter of 0.1 to 20 μm;
and said binding force reducing substance reduces said image binding force when said image is heated.

2. An image forming material as claimed in claim 1, wherein said image forming substance comprises a binder resin.

3. An image forming material as claimed in claim 1, wherein said low melting point substance has a hydrophilic group.

4. An image forming material as claimed in claim 1, wherein said low melting point substance has a hydrophilic group and a hydrophobic group.

5. An image forming material as claimed in claim 1, wherein said image forming substance is in the form of one or more particles, wherein said low temperature melting point substance is bound to outer surface of said one or more solid particles, and wherein said low temperature melting point substance is present in an amount of 1 to 50% by weight based on a total weight of said image forming substance and said low melting point substance.

6. An image forming material as claimed in claim 1, further comprising fine support particles which are infusible or which have a melting point higher than that of said low melting point substance, wherein said low melting point substance is bound to said fine support particles.

7. An image forming material as claimed in claim 6, wherein said low melting point substance is present in an amount of 10 to 90% by weight based on a total weight of said low melting point substance and said fine support particles.

8. An image forming material as claimed in claim 6, wherein said fine support particles to which said low melting point substance is bound are bound to outer surfaces of said solid particles of said image forming substance.

9. An image forming material as claimed in claim 8, wherein said fine support particles to which said low melting point substance is bound are present in an amount of 1 to 50% by weight based on the a total weight of said image forming substance, said fine support particles and said low melting point substance.

10. An image forming material as claimed in claim 6, wherein said fine support particles to which said low melting point substance is bound are comprised in said solid particles of said image forming substance.

11. An image forming material as claimed in claim 10, wherein said fine support particles to which said low melting point substance is bound are present in an amount of 5 to 75% by weight based on the a total weight of said image forming substance, said fine support particles and said low melting point substance.

12. An image forming material as claimed in claim 6, wherein said fine support particles to which said low melting point substance is bound have an average particle diameter of 0.1 to 20 μm.

13. An image forming material as claimed in claim 6, wherein said low melting point substance have hydrophilic groups and hydrophobic groups, and wherein said fine support particles have hydrophilic groups.

14. An image forming material as claimed in claim 1, further comprising fine support particles which are infusible or which have a melting point higher than that of said low melting point substance, wherein said low melting point substance is held within said fine support particles.

15. An image forming material as claimed in claim 14, wherein said low melting point substance is present in an amount of 10 to 90% by weight based on a total weight of said low melting point substance and said fine support particles.

16. An image forming material as claimed in claim 14, wherein said image forming substance is in the form of solid particles and said fine support particles in which said low melting point substance is held are bound to outer surfaces of said solid particles of said image forming substance.

17. An image forming material as claimed in claim 16, wherein said fine support particles in which said low melting point substance is held are present in an amount of 1 to 50% by weight based on the a total weight of said image forming substance, said fine support particles and said low melting point substance.

18. An image forming material as claimed in claim 14, wherein said image forming substance is in the form of solid particles and said fine support particles in which said low melting point substance is held are contained in said solid particles of said image forming substance.

19. An image forming material as claimed in claim 18, wherein said fine support particles in which said low melting point substance is held are present in an amount of 5 to 75% by weight based on the a total weight of said image forming substance, said fine support particles and said low melting point substance.

20. An image forming material as claimed in claim 14, wherein said fine support particles in which said low melting point substance is held have an average particle diameter of 0.1 to 20 μm.

21. An image forming material as claimed in claim 14, wherein said fine support particles are porous particles.

22. An image forming material as claimed in claim 1, wherein said low melting point substance is a compound represented by the following formula:

$$(R)_n \cdot (Z)_m$$

wherein R represents an organic group,

Z is a hydrophilic group selected from the group consisting of $-PO_3H_2$, $=POH$, $-OH$, $-O-$, $-COOH$, $-CH(OH)CH_2COOH$, $-OCOY$, $-SO_3H$, $\equiv N^+X^-$, $-CONH_2$ and $-NH_2$, X is a halogen atom, Y is an alkyl group which may have one or more substituents, an aryl group which may have one or more substituents or an aralkyl group which may have one or more substituents, n is an integer of 1 to 3 determined according to the valency of Z, and m is at least 1 but is 1 only when Z is $=POH$ or $\equiv N^+X^-$.

23. An image forming material as claimed in claim 22, wherein R is an alkyl group having 1 to 40 carbon atoms or an aralkyl group having 7 to 40 carbon atoms, said alkyl and aralkyl group optionally comprises one or more halogen atoms.

24. An image forming material as claimed in claim 22, wherein R is an alkyl group having 6 to 22 carbon atoms or an aralkyl group having 7 to 28 carbon atoms, said alkyl and aralkyl groups optionally comprises one or more halogen atoms.

25. An image forming material as claimed in claim 22, further comprising fine support particles which are infusible or which have a melting point higher than that of said low melting point substance, wherein said low melting point substance is bound to said fine support particles.

26. An image forming material as claimed in claim 22, further comprising fine support particles which are infusible or which have a melting point higher than that of said low melting point substance, wherein said low melting point substance is held within said fine support particles.

27. An image forming material as claimed in claim 1, wherein said binder resin is a thermally crosslinked resin.

28. An image forming material as claimed in claim 1, wherein said image forming substance is in the form of solid particles, wherein said low melting point substance is comprised in outer peripheral regions of said solid particles, and wherein said low meting point substance is present in an amount of 5 to 75% by weight based on the total weight of said image forming substance and said low melting point substance.

29. A method of removing an image of an image forming material formed on an image recording material, said method comprising contacting a stripping member under pressure with said image on said image recording material while heating said image to reduce said image binding force; and peeling said image recording material from said stripping member to transfer said image from said image recording material to said stripping member, wherein said image forming material comprises an image forming substance, and an additional binding force reducing substance wherein said binding force reducing substance does not dissolve the components of the image forming substance when the binding force reducing substance is melted and reduces said image binding force when said image is heated.

30. A method as claimed in claim 29, wherein said image has a viscoelasticity of $10^4$ Pa to $10^6$ Pa by said heating.

31. A method as claimed in claim 29, wherein said image binding force is reduced to 2.0 kg/cm² or less by said heating.

32. A method as claimed in claim 29, wherein said image has been formed on said image recording material by fusing and fixing said image forming substance thereon.

33. A method as claimed in claim 32, wherein said heating is at a temperature higher than the fixing temperature at which said image has been formed on said image recording material.

34. An image forming process comprising depositing said image forming material according to claim 1 on an image recording material.

35. An image forming process as claimed in claim 34, further comprising removing the image formed on said image recording material to obtain a recycled recording material, and forming an image on said recycled recording material.

36. An image forming process as claimed in claim 34, wherein said image binding force is 1.0 to 4.5 kg/cm² at room temperature.

37. An image forming process comprising forming an image on an image recording material with an image binding force being established between said image and said image recording material, wherein before said image is formed, a binding force reducing substance is deposited on said image recording material, wherein said binding force reducing substance reduces said image binding force when said image is heated, and is represented by the following formula:

$$(R)_n \cdot (Z)_m$$

wherein R represents an organic group,

Z is a hydrophilic group selected from the group consisting of $-PO_3H_2$, $=POH$, $-OH$, $-O-$, $-COOH$, $-CH(OH)CH_2COOH$, $-OCOY$, $-SO_3H$, $\equiv N^+X^-$, $-CONH_2$ and $-NH_2$, X is a halogen atom, Y is an alkyl group which may have one or more substituents, an aryl group which may have one or more substituents or an aralkyl group which may have one or more substituents, n is an integer of 1 to 3 determined according to the valency of Z, and m is at least 1 but is 1 only when Z is $=POH$ or $\equiv N^+X^-$.

* * * * *